United States Patent [19]
Toyoda et al.

[11] Patent Number: 5,376,868
[45] Date of Patent: Dec. 27, 1994

[54] DRIVING FORCE CONTROLLER FOR ELECTRIC MOTOR VEHICLE

[75] Inventors: Minoru Toyoda; Shuzo Moroto; Mutsumi Kawamoto, all of Nagoya; Mitsugi Yamashita, Tokyo, all of Japan

[73] Assignee: Aisin Aw Co., Ltd., Japan

[21] Appl. No.: 864,874

[22] Filed: Apr. 1, 1992

[30] Foreign Application Priority Data

Apr. 1, 1991 [JP] Japan .................................. 3-68243

[51] Int. Cl.$^5$ ............................................ B60L 11/00
[52] U.S. Cl. ...................................... 318/587; 318/52; 364/426.02; 364/426.03
[58] Field of Search ................. 318/139, 587, 52, 806, 318/808, 376, 67; 180/165, 197, 65.8, 246, 248, 244, 247, 233; 364/424.01, 424.02, 426.02, 426.03

[56] References Cited

U.S. PATENT DOCUMENTS

| | | | |
|---|---|---|---|
| 3,756,335 | 9/1973 | Eisele et al. | 180/6.28 |
| 4,327,313 | 4/1982 | Tsuboi et al. | 318/52 |
| 4,906,906 | 3/1990 | Lautzenhiser et al. | 318/269 |
| 4,926,329 | 5/1990 | Stelter et al. | 364/424.01 |
| 5,117,163 | 5/1992 | Sandberg | 318/52 |
| 5,126,997 | 6/1992 | Fukuda et al. | 364/426.02 |
| 5,132,908 | 7/1992 | Eto et al. | 364/426.03 |
| 5,148,883 | 9/1992 | Tanaka et al. | 180/165 |
| 5,164,903 | 11/1992 | Lin et al. | 364/426.03 |
| 5,168,950 | 12/1992 | Krusche | 180/197 |
| 5,172,319 | 12/1992 | Shiraishi et al. | 364/426.03 |
| 5,172,784 | 12/1992 | Varela, Jr. | 180/65.4 |
| 5,227,974 | 7/1993 | Tomoda et al. | 364/424.05 |

Primary Examiner—Paul Ip
Attorney, Agent, or Firm—Lorusso & Loud

[57] ABSTRACT

A driving force controller for an electric motor vehicle which suppresses changes in behavior of a vehicle when a right or left driving wheel experiences trouble and detects vehicle conditions to independently control the driving force of each wheel so as not to deviate from a predetermined range. The driving force controller computes a driving force for each wheel in accordance with a demand value for driving force and a detected vehicle traveling condition to drive each wheel independently by electric motors. Motor drivers control the motors so that each motor generates power corresponding to the value of driving force computed therefor. A driving demand detector detects the value of driving force demanded for the vehicle and a vehicle condition detector detects a traveling condition of the vehicle. Wheel driving condition detectors detect conditions at the wheels. A computer computes the values of driving force to be provided at each wheel in accordance with the value of driving force demanded and the detected vehicle traveling conditions and corrects the values computed for individual wheel driving forces when a vehicle traveling condition or a wheel driving condition exceeds a predetermined range.

18 Claims, 19 Drawing Sheets

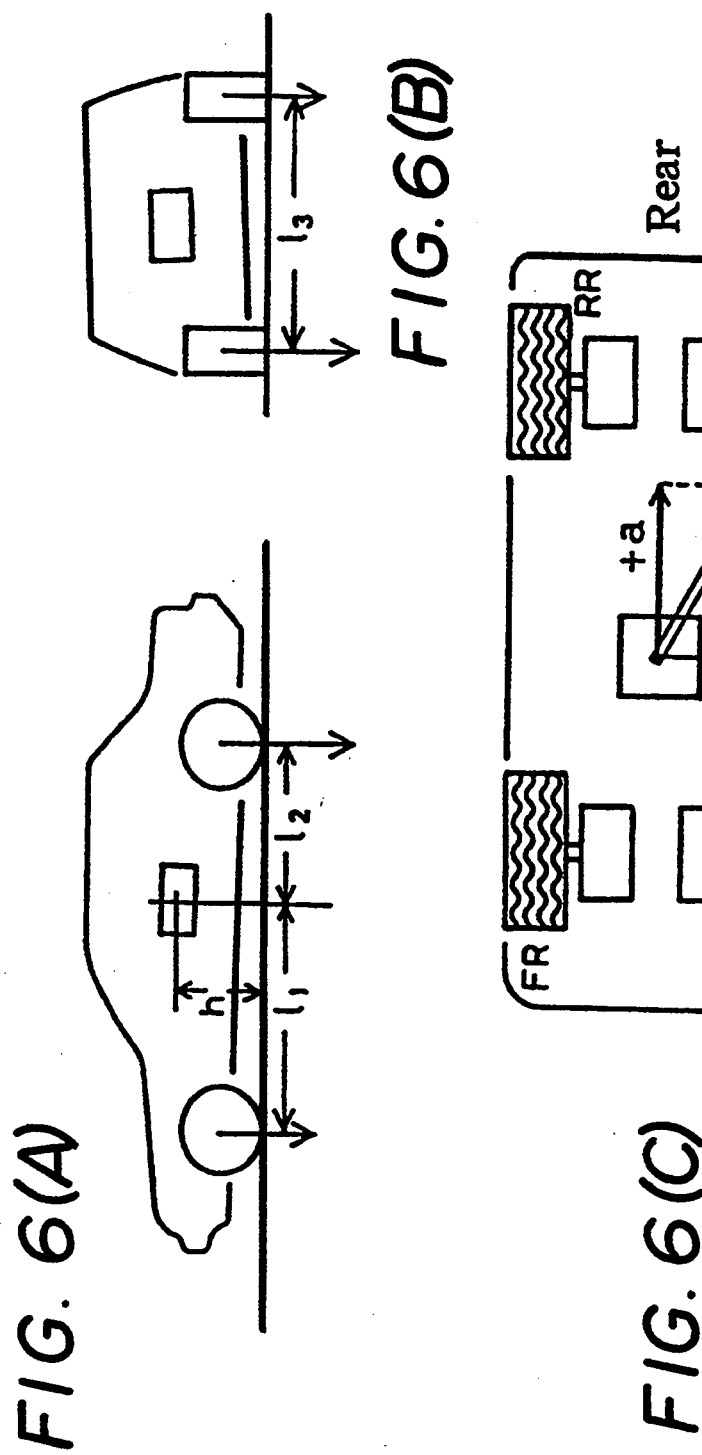

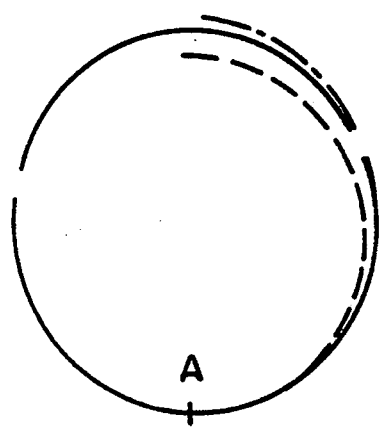
FIG. II(A)
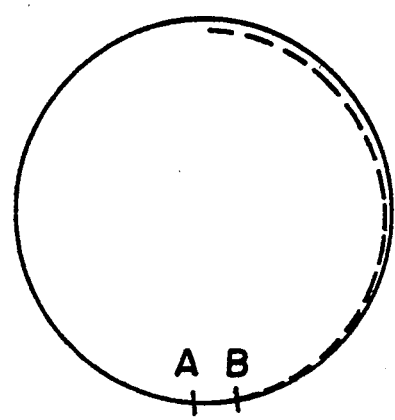
FIG. II(B)
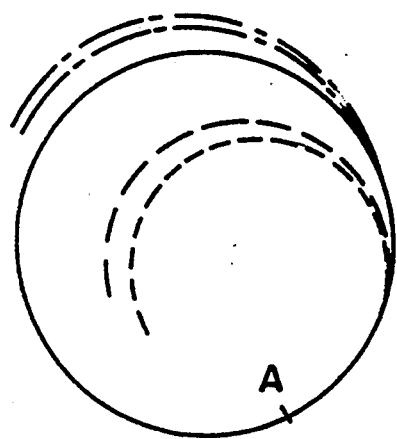
FIG. II(C)
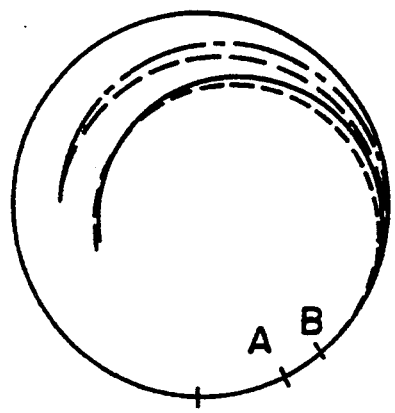
FIG. II(D)

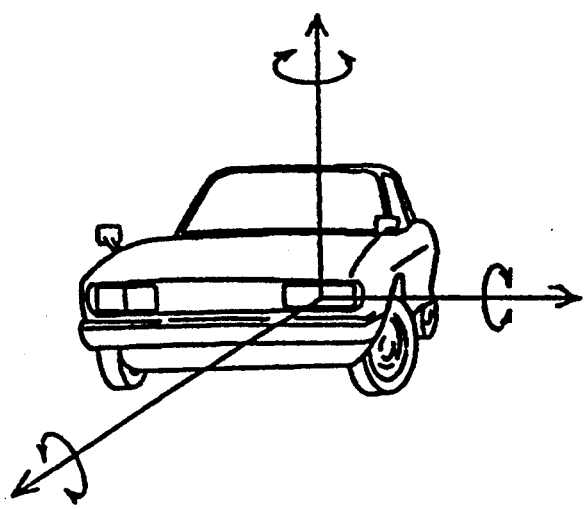
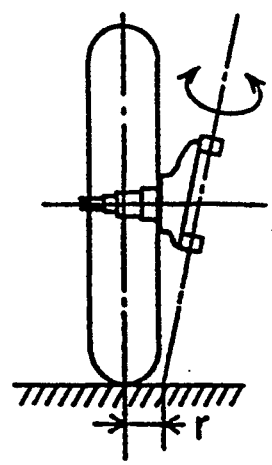
FIG.13(A)  FIG.13(B)
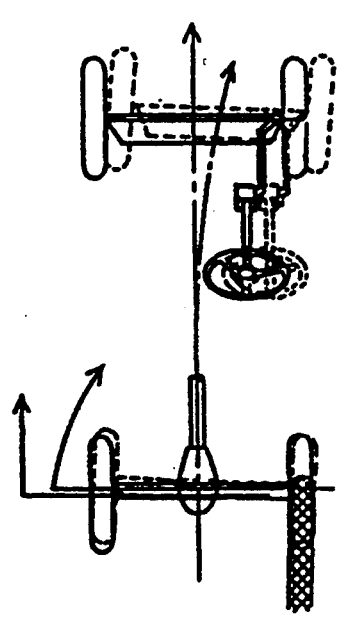
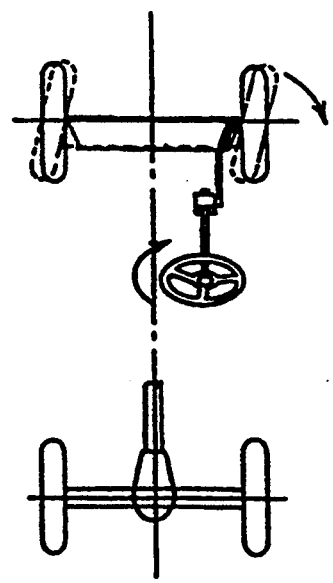
FIG.13(C)  FIG.13(D)

| Yaw acceleration (rad/s²) | Right front (kgf) | Left front (kgf) | Left rear (kgf) |
|---|---|---|---|
| +3 | +150 | −75 | −75 |
| +2 | +100 | −50 | −50 |
| +1 | +50 | −25 | −25 |
| 0 | 0 | 0 | 0 |
| −1 | −50 | +25 | +25 |
| −2 | −100 | +50 | +50 |
| −3 | −150 | +75 | +75 |

FIG. 19

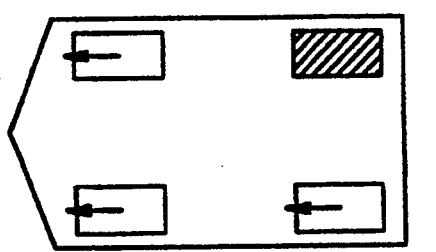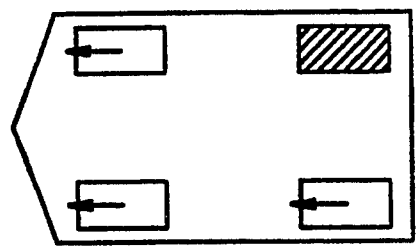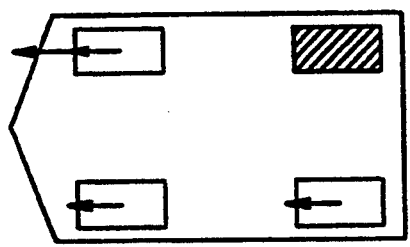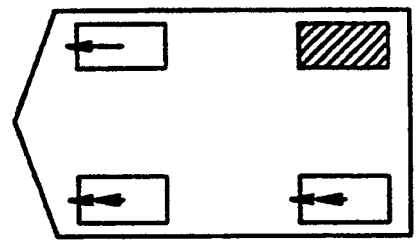
FIG. 20(A)  FIG. 20(B)

DRIVING FORCE CONTROLLER FOR ELECTRIC MOTOR VEHICLE

BACKGROUND OF THE INVENTION

1. Field of the Invention

The present invention relates to a driving force controller for an electric motor vehicle for distributing driving forces individually to each wheel in accordance with values for driving force required for the vehicle and travelling conditions to drive each wheel independently by electric motors instead of a conventional motor.

2. Description of the Related Art

Recently, four-wheel drive (4WD) vehicles and electric cars have drawn special attention by the public.

Conventionally, a 4WD vehicle has one driving source and its driving force is transmitted to wheels mechanically through the intermediary of a transfer unit, a propeller shaft and front and rear wheel differentials, etc. The mechanism which performs a torque distribution function in the mechanical 4WD vehicle is the transfer unit, but generally it just distributes torques to front and rear wheels and the ratio of such distribution is limited by the mechanism. Furthermore, since such distribution is controlled by hydraulic pressure, in that type of 4WD in which the ratio may be controlled, accurate torque distribution cannot be expected.

Though capable of roughly distributing front and rear torques in accordance with shift of load caused by acceleration and other factors, the prior art control system referred to above cannot deal with a shift of load caused by centrifugal force when turning around a curve, especially when the load is shifted to an outer wheel.

In a selective type 4WD, for example, motive power is connected and disconnected at the middle of a drive shaft to switch between 4WD and 2WD, and is transmitted through a switching clutch in 4WDs, relative difference in rotation as between the front and rear wheels is not permitted, causing a tight corner braking phenomenon.

In a case of a center differential type 4WD, though relative rotation is allowed by a differential gear, only a fixed torque distribution ratio can be set due to the gear arrangement. Thus, when driving force cannot be adequately transmitted to the road surface due to reduced traction at either the front wheels or the rear wheels due to encountering a muddy spot, etc., the driving force transmitted to the other wheels is lowered automatically by the fixed distribution ratio and the overall driving force is thereby drastically lowered.

In a viscous coupling type 4WD, torque is transmitted from a member rotating at high speed to a member rotating at low speed when the difference in relative rotation between front and rear wheels becomes great. That is, normally it drives only with the front wheels, and torque is transmitted to the rear wheels only when the front wheels rotate idly. In a torque split type 4WD, a multi-plate clutch is used and transmission capacity is adjusted by hydraulic pressure to effect torque distribution. Though in many cases the hydraulic pressure is now controlled by a computer, active distribution cannot be expected if there is no relative difference in rotation.

FIG. 12 illustrates the limit for driving force at a tire.

Considering factors that determine driving force of a tire, the limit for driving force of a tire is determined by a balance between a limit for frictional force produced by a vertical load and the resultant driving force F including component Fx in the advancing direction and cornering force Fy in the lateral direction, as shown in FIG. 12. That is, when a load shift is caused by acceleration and turning and the load on a wheel is thereby changed, the limit for frictional force is changed accordingly. The limit for frictional force changes similarly when the road surface condition is snowy or muddy. Cornering force becomes great when a sharp turn is made and as a result, the limit for driving force in the advancing direction is lowered.

Therefore,

Limit of driving force $Fx.max = (F^2 - Fy^2)^{\frac{1}{2}}$

As described above, the conventional 4WD vehicles cannot produce an optimum distribution of driving forces since the limit of the driving force for each wheel changes with traveling conditions. For example, when a vehicle is to be accelerated while making a turn, load is applied to the outside thereof by centrifugal force, so that the grounding load on an inner wheel becomes smaller while the grounding load on an outer wheel becomes larger, creating a large difference between the limits for the driving forces applied at the outer and inner wheels. Although some conventional 4WD vehicles have a mechanism for restricting the differential between left and right wheels, such vehicles do not have active torque distribution and cannot control the difference between driving forces at the right and left wheels, so that only a relatively small driving force corresponding to the limit for driving force at an inner wheel may be applied. Cornering capability of the vehicle may be lowered and the vehicle may become unstable if the driving force exceeds that limit.

Moreover, when one wheel comes off or turns idly on a muddy spot in the conventional mechanical 4WD vehicle the driving force transmitted to the other wheels is drastically lowered since the right and left wheels are linked by a differential.

From the foregoing, the importance of controlling the four wheels independently, corresponding to their driving force limits, may be appreciated.

Much attention has been paid as of late to electric motor vehicles due to the problem of pollution by exhaust gas of conventional engine vehicles. Electric vehicles are now more and more regarded as important together with solar cars carrying solar batteries, i.e. clean energy, from the aspect of a global scale environmental problem. Because a solar car itself is fundamentally an electric car, development of an electric motor vehicle that can be widely put into practical use is strongly desired.

A vehicle with an electric motor typified by conventional electric cars normally has one motor and driving force is distributed by a differential gear unit and associated structure. Due to that, the ratio of driving forces distributed to right and left wheels remains constant.

The use of two motors to drive right and left rear wheels independently is disclosed in (Japanese Utility Model Application Laid-Open No. 55-138129). In this disclosure, when an accelerator pedal is depressed while travelling at speeds less than a set value, the motors are switched to four wheel driving.

When a vehicle is turning at high speed, however, the grounding load is shifted between right and left wheels since a large centrifugal force is generated on the vehicle body, so that the grounding load on the turning inner wheels is reduced and the grounding load on the outer wheels is increased as described above. At this time, because the conventional vehicle described above is designed so that torques to the right and left wheels are equalized by the differential gear, when the grounding load on the inner side wheels is reduced and the limit for driving force is thereby lowered, the limit for driving force at the outer side wheels is also lowered. As a result, slip limit speed is lowered.

Furthermore, because the conventional vehicle only drives four wheels in particular traveling conditions, even if the grounding load shifts during turning, driving forces cannot be effectively distributed responsive to the shift of the grounding load. That is, such a prior art vehicle fully utilizes the driving force of all motors only when the accelerator pedal is depressed while traveling at low speeds less than a set value and adopts the four wheel drive only temporarily.

The applicant named in the present application has previously proposed a driving force controller for an electric motor vehicle which eliminates the aforementioned problems (e.g. Japanese Patent Application No. 62-25736). This controller is provided with a means for detecting centrifugal force, a means for detecting the required driving force value and a computation controlling means for finding shift of loads from the centrifugal force to set driving forces for right and left wheels and for controlling electric motors for independently driving the right and left wheels. The controller drives the right and left wheels independently by driving forces which correspond to the grounding loads on the right and left wheels. Thus the driving forces that correspond to the grounding loads on the right and left wheels are distributed to achieve maximum utilization of the driving forces and acceleration is enhanced even during cornering, while preventing slip from occurring.

FIGS. 13A through 13D are drawings explaining various motions of an automobile. As shown in FIG. 13A, an automobile has a vertical motion, a yawing motion pivoting on the vertical motion, a longitudinal motion and a rolling motion pivoting on the longitudinal motion.

A vehicle which drives a plurality of wheels independently can control each driving force regardless of driving conditions, so that it can continue to generate driving forces without interruption caused by a given wheel. Accordingly, when trouble occurs at either the right or the left driving motor or wheel, while each wheel is being driven according to a predetermined driving force distribution ratio, the other driving motors keep generating the same driving force and a large difference between the driving forces at the right and left wheels is created, so that an undesirable yawing force (a vehicle turning force) is generated and the direction of the vehicle is changed as shown in FIG. 13B. If the vehicle is front wheel driving, a force is received at the steering wheel and a phenomenon whereby the steering force is changed in a manner similar to that experienced when a tire goes flat, as shown in FIG. 13C. The difference appears as a torque difference around a king pin as shown in FIG. 13d and a large manual steering force is required since one force is generated in the driving direction and another force is generated in the braking direction.

However, since the driving force controller of the electric motor vehicle in applicants' aforementioned application merely drives the right and left wheels in accordance with the grounding loads on the right and left wheels, the driving forces cannot be corrected even when the condition of the vehicle deviates from a predetermined range and a large difference is created between the driving forces at the right and left wheels and, accordingly, an undesirable yawing force is generated.

Accordingly, it is an object of the present invention to solve the aforementioned problems by providing a driving force controller that suppresses changes in the behavior of the vehicle when traction 3 is lost or reduced at either the right or the left driving wheels.

It is another object of the present invention to provide a driving force controller that detects vehicle conditions to control driving force independently at each wheel so as not to deviate from a predetermined range.

SUMMARY OF THE INVENTION

In order to attain the aforementioned goals, according to the present invention, a driving force controller for an electric motor vehicle is provided by which driving force is distributed among the wheels in accordance with values for a demanded driving force and vehicle traveling conditions to drive each wheel independently by electric motors. The controller of the present invention includes plural motor drivers for controlling the motors so that they individually transmit power corresponding to computed values of driving forces, driving demand detecting means for detecting the values of driving forces required for the vehicle, vehicle condition detecting means for detecting vehicle traveling conditions, wheel driving condition detecting means for detecting wheel driving conditions, driving force computing means for computing the value of driving force to be generated at each wheel in accordance with the value of demanded driving force and the vehicle traveling conditions and for correcting the values of the computed driving forces when the vehicle traveling conditions or the wheel driving conditions exceed a predetermined limit.

According to the present invention, the value of driving force to be generated at each wheel is computed based on respective detection signals from the driving demand detecting means, vehicle condition detecting means and motor condition detecting means. The value of the driving force to be distributed to each wheel, corresponding to a shift of grounding load from the inner wheels to the outer wheels when turning, is determined so that the cornering capability and stability of the vehicle may be maintained. Furthermore, the values of the driving forces for the individual wheels are corrected when the vehicle traveling conditions or the wheel driving conditions fall outside of predetermined ranges, so that when either a right or a left wheel encounters a problem, i.e. when slip or spin occurs, the driving force may be controlled so that any change in traveling condition due to the encountered problem is corrected and stability is realized.

BRIEF DESCRIPTION OF THE DRAWINGS

FIGS. 6a, 6b and 6c are side, rear and bottom views, respectively, of a vehicle, explaining symbols used for calculating load distribution;

FIGS. 11a through 11d are diagrams illustrating examples of divergence of a vehicle from the intended course due to yaw moment produced when driving force is lowered by a reduction in traction at one wheel during turning;

FIGS. 13a through 13d are diagrams explaining various motions of an automobile;

FIG. 19 is a table illustrating a map of driving force compensations for each wheel when the right rear wheel loses traction; and FIGS. 20a and 20b are drawings explaining various possibilities for controlling driving force at each wheel.

DETAILED DESCRIPTION OF PREFERRED EMBODIMENTS

Figure 1:
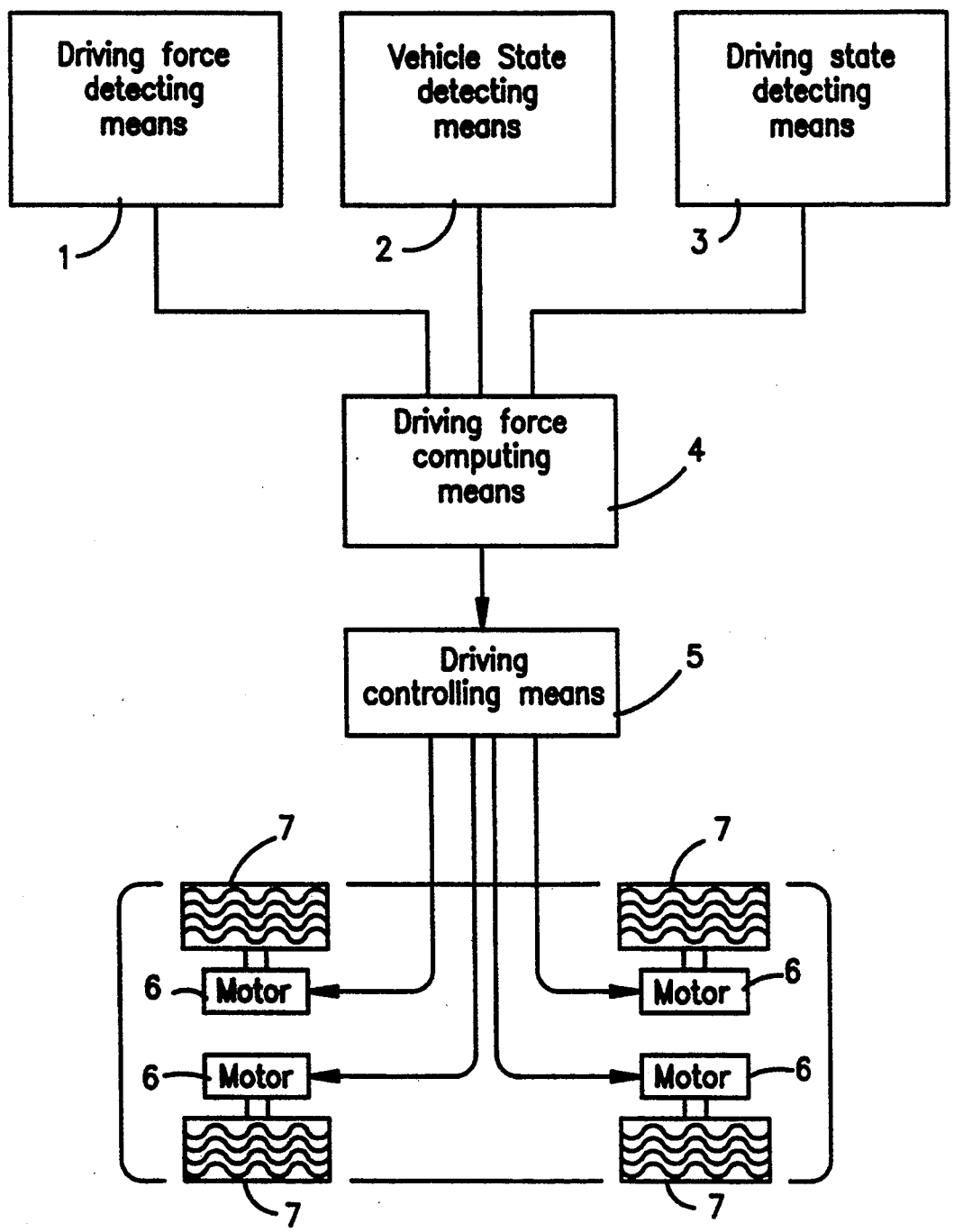
FIG. 1 is a block diagram illustrating one preferred embodiment of a driving force controller for an electric motor vehicle according to the present invention.

Referring now to the drawings, preferred embodiments of the present invention will be explained.

In FIG. 1 a driving demand detecting means 1 detects demand for travel by a driver as a value of demanded driving force which is determined, not only by degree of accelerator pedal depression, for example, but also by degree of brake application and further by traveling range remaining at that time. That is, control of acceleration and deceleration and constant traveling is based on the foregoing factors. A vehicle condition detecting means 2 detects acceleration, grounding load and steering angle, etc., for example, as vehicle traveling conditions and it may be, an acceleration sensor, a suspension stroke meter, a piezoelectric strain gage or a steering angle sensor, etc. A driving condition detecting means 3 detects driving conditions for each wheel, such as rate of rotation, driving signal, etc. and consists of a speed sensor for detecting rotational frequency of the wheel drive motor and a current sensor for detecting driving current of the motor. A driving force computing means 4 uses a shift of grounding load as basis for computing a distribution value of driving force at each wheel in accordance with the value of driving demand detected by the driving force detecting means 1 and the vehicle travelling conditions detected by the vehicle condition detecting means 2. The driving force computing means 4 also sets predetermined ranges for the vehicle traveling conditions and the wheel driving conditions and corrects the values for the driving forces to be distributed when they fall outside those predetermined ranges. A driving control means (plural motor drivers) 5 controls each motor 6 which drives an associated wheel 7 in accordance with the value of the driving force computed by the driving force computing means 4.

As described above, the driving force controller of the present invention computes an optimum driving force value by finding a limit for driving force for a shift of grounding load between wheels under normal traveling conditions. It then sets the predetermined ranges for vehicle traveling conditions and the wheel driving conditions such as current state, acceleration, rotational speed of wheels, grounding loads and changes in steering angle, and when the conditions fall outside the predetermined ranges, it judges that a problem has been encountered and corrects the value for a computed driving force so that the behavior of the vehicle will not become unstable.

If a problem occurs in the motor such as burning of the motor coil, breakage of a cable between a driving circuit and the motor or damage of a transistor in a power transistor circuit, no current flows, so that driving torque becomes unstable, thereby causing the vehicle itself to become unstable. Also, if a problem such as dislocation of a resolver or erroneous operation of a signal generating circuit occurs, current flow becomes defective, causing the driving torque and the vehicle itself to become similarly unstable. When slip or spin occurs, rapid changes in the acceleration, grounding loads and rotational speed of the wheels are detected. Therefore, according to the present invention, only the distribution of the driving force value needs to be corrected so that the changes in the behavior of the vehicle caused by such trouble are minimized.

Figure 2:
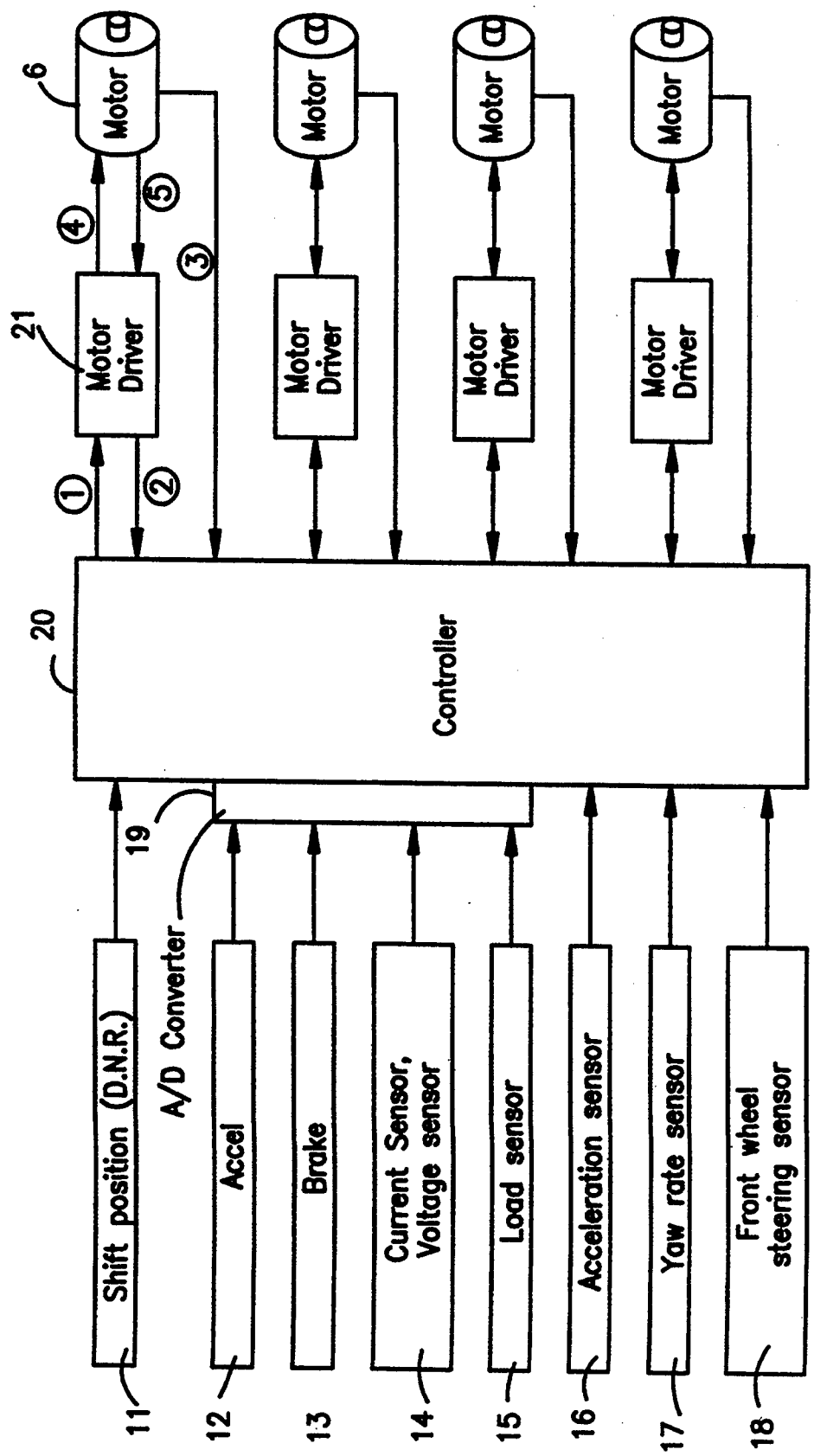
FIG. 2 is a block diagram illustrating an embodiment combining detecting means and the driving force controller for the electric motor vehicle according to the present invention.

In FIG. 2, a shift position sensor 11 detects travelling ranges such as D (Drive), N (Neutral) and R (Reverse). An accelerator opening sensor 12 detects a stepped degree of the accelerator pedal depression and detects the stroke of the accelerator pedal, for example by converting it to voltage by a variable resistor. A brake sensor 13 detects a stepped degree of the brake pedal depression. Current sensor and voltage sensor 14 detects current and voltage from a power source such as a battery and detects consumption of power from the voltage and current, to generate a reference signal for computing the operation condition of the motor. A load sensor 15 measures movement of a suspension member, for example as an output voltage of a piezoelectric strain gage, to detect load. An acceleration sensor 16 detects acceleration in the longitudinal direction of the vehicle and a yaw rate sensor 17 detects rotational acceleration around Z-axis, i.e. turning acceleration of the body. A front wheel steering sensor 18 detects the steering angle of the front wheel.

A control unit 20 receives the detection signals of each sensor mentioned above and finds the required driving force for each wheel and controls motor drivers 21 accordingly. This is equivalent to the driving force computing means 4 in FIG. 1. The demanded driving force changes depending on the degree of depression of the accelerator pedal or the brake pedal and also changes depending on traveling range, load and speed of the vehicle, even when the stepped degree remains unchanged. That is, the required driving force is found by correlating all of the foregoing. The driving force for each wheel is determined by the speed, steering angel and load and when there is an abnormality in the current or voltage of the motor or a rapid change in the acceleration, yawing force or steering angle, to correct such operating parameters.

The motor driver 21 is given a rotation direction and torque command (1) according to the corresponding driving force determined by the control unit 20 and receives a motor temperature signal (3), pole position signal and current signal (5) from the motor 6 to control current (4) of the motor 6. It then transfers the pole position signal, the current of the motor and the motor temperature to the control unit 20. Driving conditions for the wheel can be determined from those signals in the control unit 20. For example, when one wheel experiences loss of driving force during traveling, yawing force is suppressed and change in the behavior of the vehicle is kept at a minimum by changing the distribution of the driving force.

Figure 3A:
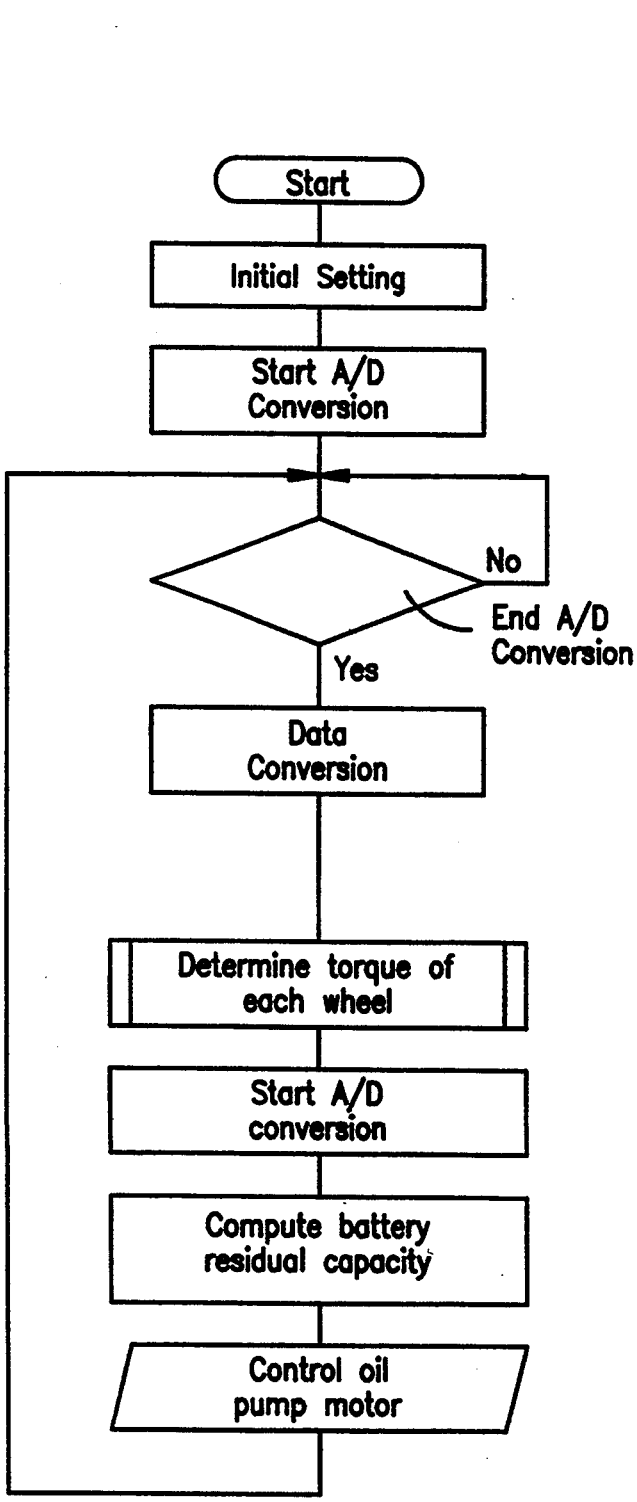
FIG. 3 is a flow chart explaining operation of the controller.

Control by the control unit 20 is carried out as shown in FIG. 3. After completion of the initial setting, analog-to-digital conversion in an A/D converter 19 is commenced as shown in FIG. 3a. When the A/D conversion is finished, predetermined computation is performed on data converted from analog to digital for each sensor to convert the data and driving force, acceleration in the longitudinal and lateral (yawing force) directions, steering angle and grounding load for each wheel, etc. are found in order to execute a torque determining process for each wheel. Then A/D the conversion is started again and before finishing the A/D conversion, the residual capacity of the battery is computed to control an oil pump motor. The same process is repeated after finishing the A/D conversion.

The residual capacity of the battery is related to traveling distance and to efficiency of the vehicle, so that it is indicated to alert to the driver of the vehicle and torque output is restricted when its value becomes especially low. The oil pump motor circulates oil for forced cooling of the motor and becomes active when motor temperature rises or motor current becomes excessive.

Figure 3B:
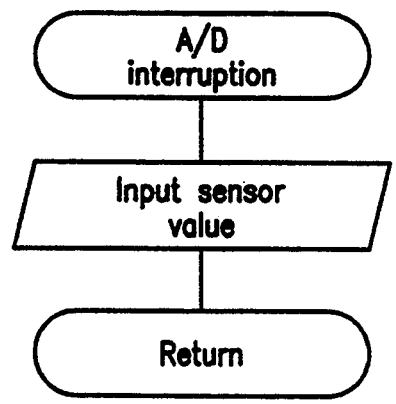

The signals from each sensor is inputted sequentially by A/D interruption handling from the A/D converter 19 by the A/D conversion start command in FIG. 3a as shown in FIG. 3b. When the input of the sensor values is finished and signals indicating that the A/D conversion is finished are received from the A/D converter 19, the Judgment that the A/D conversion has finished in FIG. 3a is made.

Figure 3C:
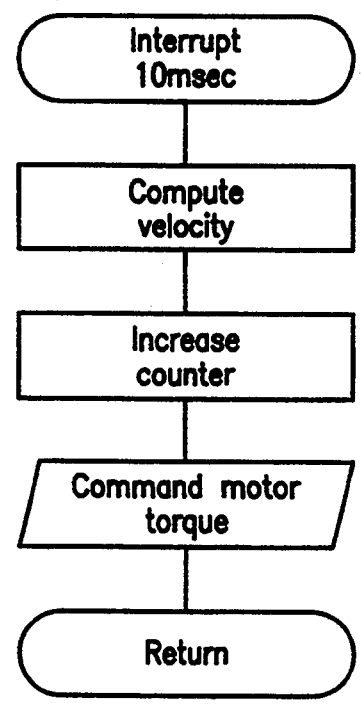

Then, as shown in FIG. 3c, computation of speed of the motor driver 21, incrementing of a counter for computing traveling distance from 10 msec and the speed of the vehicle and outputting of the determined motor torque command to the driver are carried out while interruption handling is carried out every 10 msec.

Next, a process for determining torque of each wheel will be explained.

Figure 4:
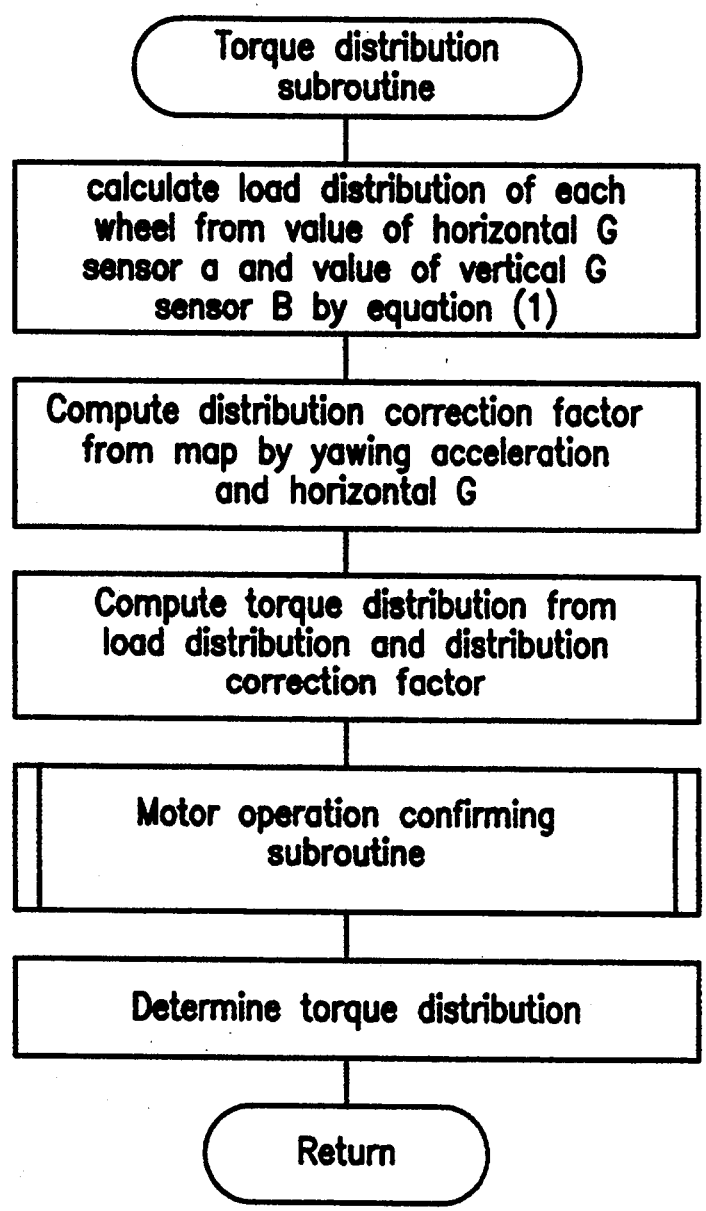
FIG. 4 is a flow chart showing a torque distribution subroutine.

FIG. 4 shows the torque determining process of each wheel in FIG. 3a. In a torque distribution subroutine, load distribution of each wheel is calculated from the value of the transverse G sensor (the yaw rate sensor 17) b and value of a longitudinal G sensor (the acceleration sensor 16) a by the following expression:

$$\text{Right front wheel } FR = \frac{gl_2 - ah}{g(l_1 + l_2)} * \frac{gl_3 - 2bh}{2gl_3}$$

$$\text{Left front wheel } FL = \frac{gl_2 - ah}{g(l_1 + l_2)} * \frac{gl_3 + 2bh}{2gl_3}$$

$$\text{Right rear wheel } RR = \frac{gl_2 + ah}{g(l_1 + l_2)} * \frac{gl_3 - 2bh}{2gl_3}$$

$$\text{Left rear wheel } RL = \frac{gl_2 + ah}{g(l_1 + l_2)} * \frac{gl_3 + 2bh}{2gl_3}$$

$$FR + FL + RR + RL = 1$$

where, as shown in FIG. 6, h is the height of the center of gravity, $l_1$ is a length from the center of gravity to the front wheel, $l_2$ is a length from the center of gravity to the rear wheel and $l_3$ is the width between the right and left wheels.

Figure 5A:
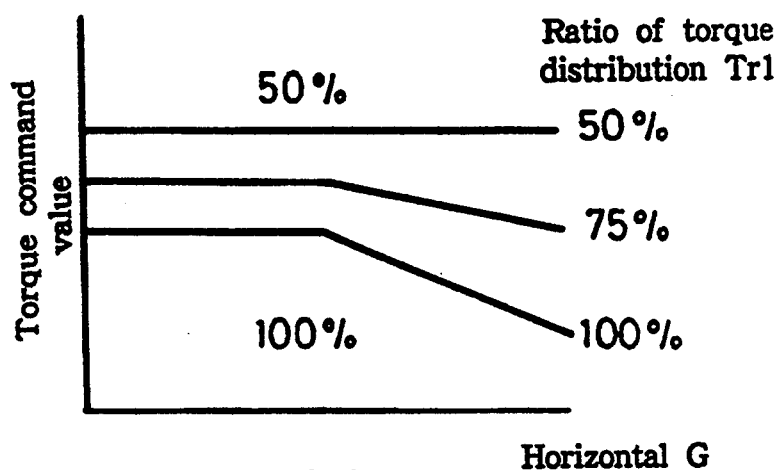
FIGS. 5a, 5b and 5c are diagrams illustrating examples of maps used for torque distribution.
Figure 5B:
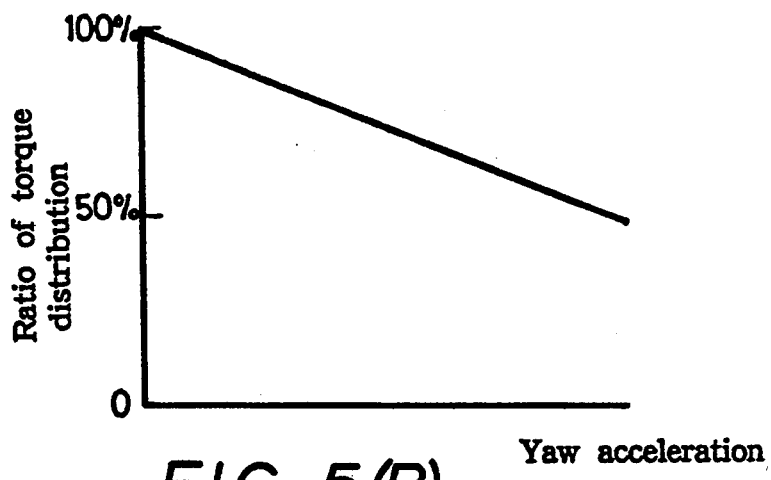
Figure 5C:
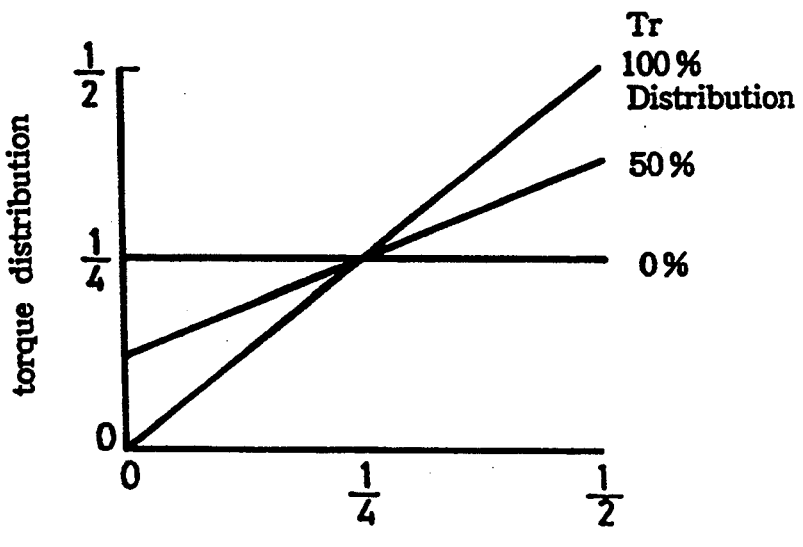

Then, a distribution correction factor is computed from maps shown in FIGS. 5a and 5b from the yawing acceleration and the transverse G while torque distribution is computed from a map shown in FIG. 5c from load distribution and the distribution correction factor.

Then ratio Tr1 of the torque distribution is computed from the map shown in FIG. 5a from the torque command value (demanded driving force) and from the horizontal G while ratio Tr2 of the torque distribution is computed from the map shown in FIG. 5b from the yawing acceleration. The map shown in FIG. 5c is applied when the ratio of torque distribution Tr=Tr1×Tr2 to compute the torque distribution from the load distribution. That is, as seen from the ratio of torque distribution Tr in the map shown in FIG. 5c, the distribution correction factors Tr1 and Tr2 distribute 100% in accordance with the load distribution when the torque command value, horizontal G and yawing acceleration are small. However as the torque command value and the horizontal G as well as the yawing acceleration become large, they try to correct the distribution ratio to below that using the map. Accordingly, as shown in FIG. 5c, torque distribution that corresponds to load distribution is carried out when the torque distribution ratio is 100% and when the torque distribution ratio is 0%, ¼ of torque distribution is carried out regardless of the load distribution.

Now the motor operation confirming subroutine is executed and the torque distribution is determined.

Figure 7:
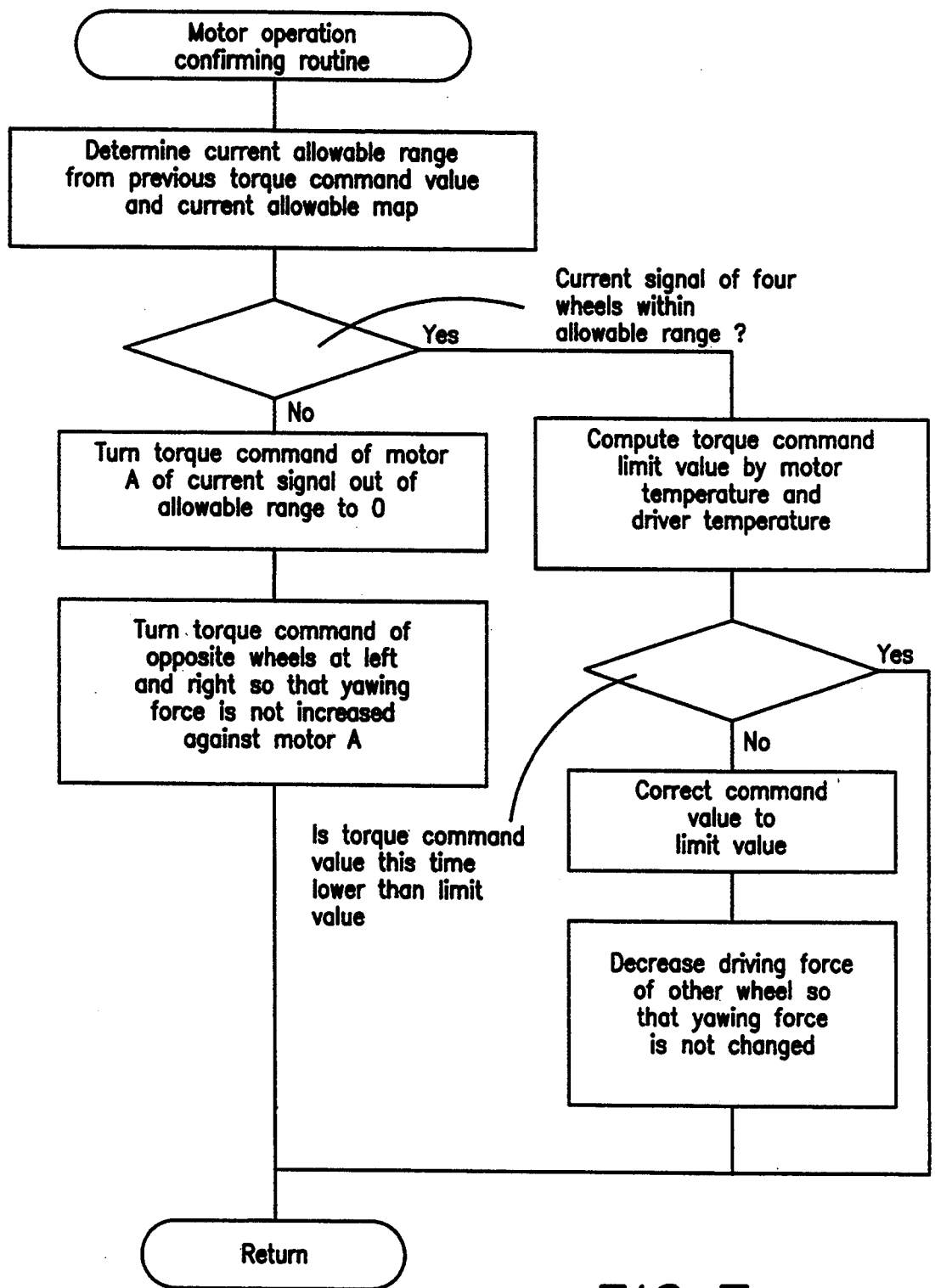
FIG. 7 is a flow chart illustrating a motor operation confirming subroutine.
Figure 8:
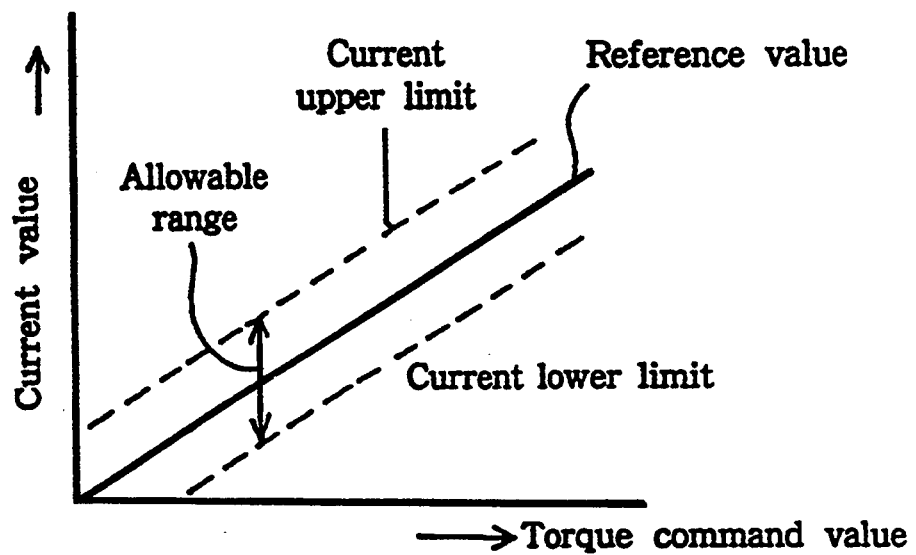
FIGS. 8a and 8b are diagrams illustrating examples of maps used for confirming motor operations.
Figure 8:
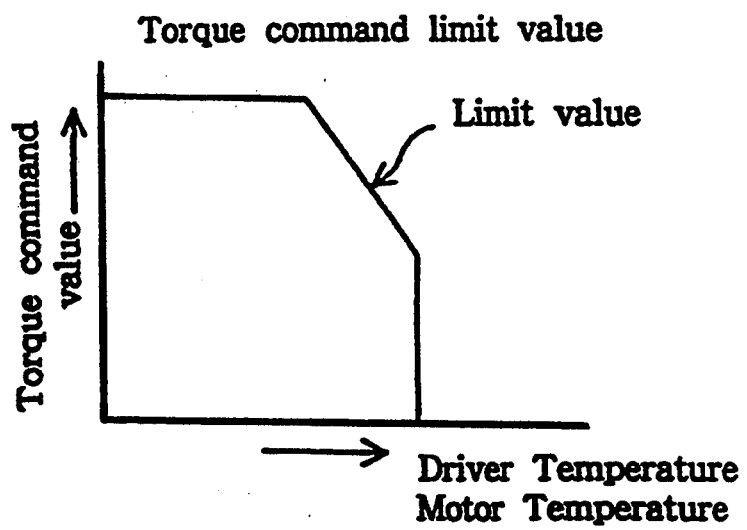

The motor operation confirming subroutine determines a current allowable range from the current allowance map shown in FIG. 8a, from the previous torque command value as shown in FIG. 7. The purpose of the allowable range is to judge any abnormal condition such as disconnection of the motor or over-current and consists of current values having upper and lower limits with a width of a certain allowable range from a reference value that corresponds to torque command value. This allowable range is used to judge whether the current signal of each motor driving four wheels falls within it.

If the answer is NO (not within the allowable range, i.e. the current of the motor is abnormal), the torque command of the motor with a current signal which is out of the allowable range is changed to zero and the torque command to the opposite wheel with a right or left is changed to zero so that yawing force does not increase against the motor.

If the answer is YES (within the allowable range, i.e. the current of the motor is in normal state), the torque command limit value is computed from the torque command limit value map shown in FIG. 8b, from the motor temperature and driver temperature to judge whether the torque command value this time is lower than the limit value. It the answer is YES, i.e. the torque command value is lower than the limit value, the process remains as it is. When the answer is NO, i.e. the torque command value is higher than the limit value, the command value is corrected to the limit value to reduce the driving force of the opposite side wheel so that yawing force does not change and balance is maintained. Then the process is reversed. That is, when the torque command value is large, it is limited and the limit value is further limited when the motor temperature and the driver temperature become higher, as shown in FIG. 8b.

Figure 9:
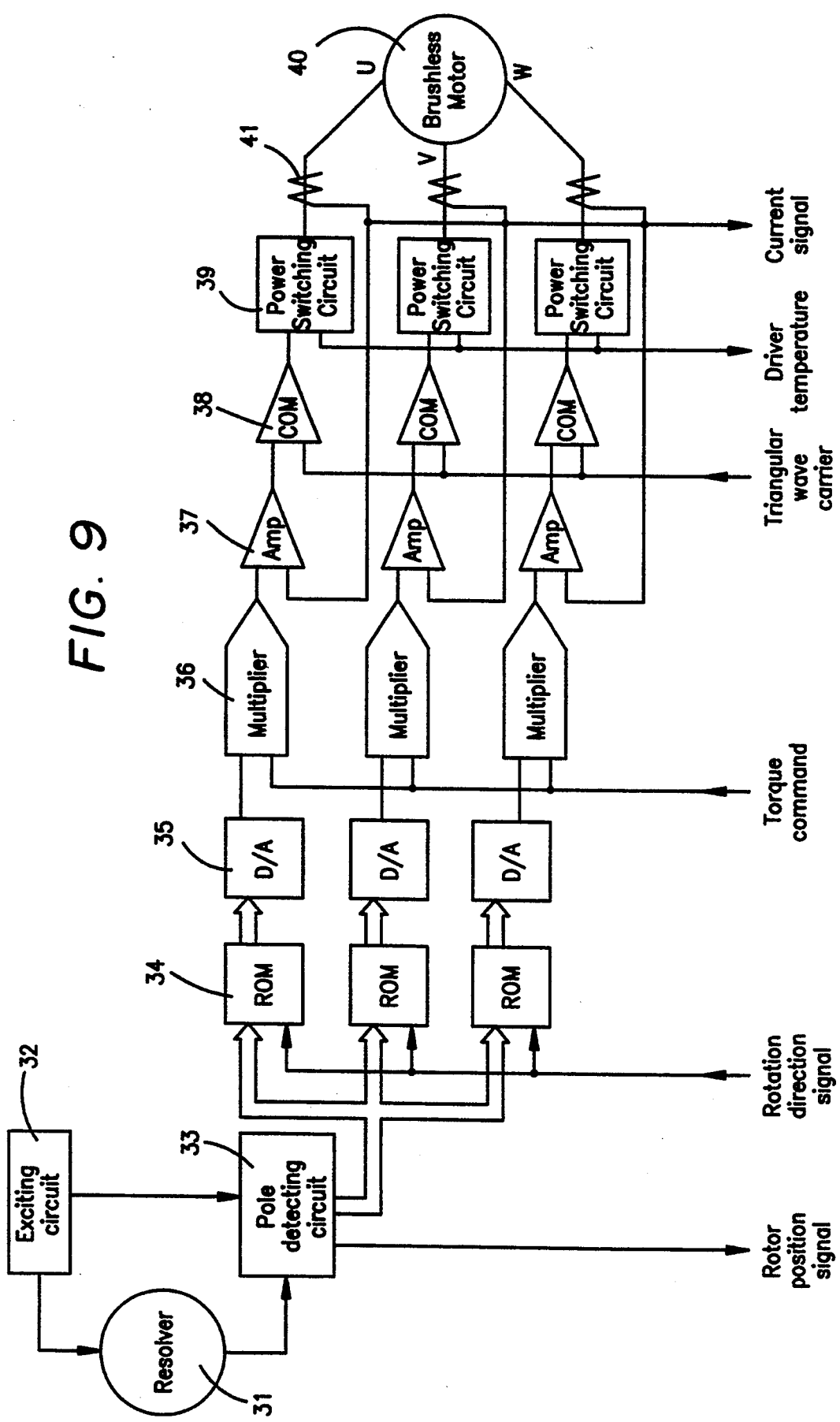
FIG. 9 is a circuit diagram illustrating an embodiment of a motor driver, including a voltage type PWM inverter in a current trailing scheme using comparison of triangular waves.

FIG. 9 is a diagram illustrating an example of a motor driver with by a voltage type PWM inverter in current trailing scheme employing comparison of triangular waves.

The motor driver 21 controlling the motor of each wheel consists of, for example, a voltage type PWM inverter in current trailing scheme employing comparison of triangular waves shown in FIG. 9. A resolver 31 is excited by circuit 32 and generates a sine wave signal from which, a magnetic pole detecting circuit 33 detects a position of a pole and sends out a rotor position signal. ROM 34 reads out a three-phase digital signal having 2 pi/3 phase difference that excites the brushless motor 40 with a pole position signal and rotation direction signal. D/A converter 34 converts digital signals read out from the ROM 34 to analog sine wave signals. A multiplier 36 multiplies the output signal of the D/A converter 35 with a torque command (current command) to generate a signal having a peak value that corresponds to the torque command. A current amplifier 37 controls the current of the brushless motor 40 determined by the current sensor 41 to be equal to this current. A comparator 38 compares the output of the current amplifier 37 with the triangular wave carrier to modulate pulse width and a power switching circuit 39 switches the current of the brushless motor 40 in accordance with the pulse modulated by the comparator 38 by a semiconductor controlling rectifying device such as, for example, power transistors and thyristors. Temperature of the power transistor in the power switching circuit 39 is monitored to detect overheating caused by overload of the brushless motor 40.

FIGS. 10a through 10f are diagrams illustrating examples of paths generated by yaw moment when driving force is lowered caused by failure at either the right or left wheel during straight advancement and FIGS. 11a through 11d are diagrams illustrating examples of paths of a vehicle generated by yaw moment when driving force is lowered caused by failure on either the among right or left wheel during turning.

Next, an example of operation of the present invention when either the right or left wheel fails will be explained.

Figure 10A:
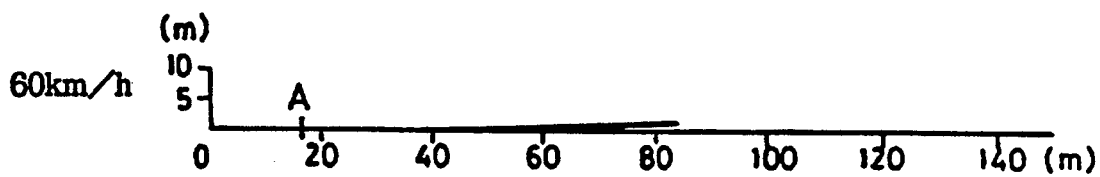
FIGS. 10a through 10f are diagrams illustrating examples of divergence from a straight course due to yaw movement resulting from a reduction in driving force where traction is reduced at one wheel.
Figure 10B:
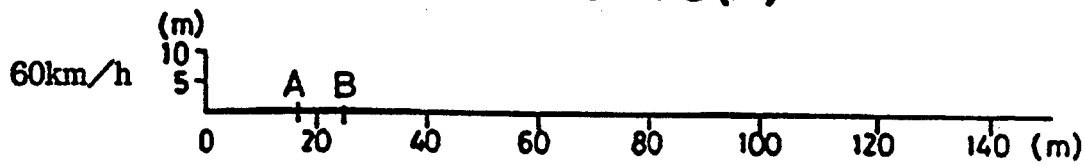
Figure 10C:
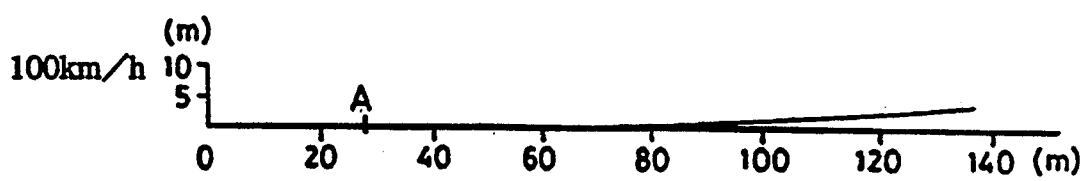
Figure 10D:
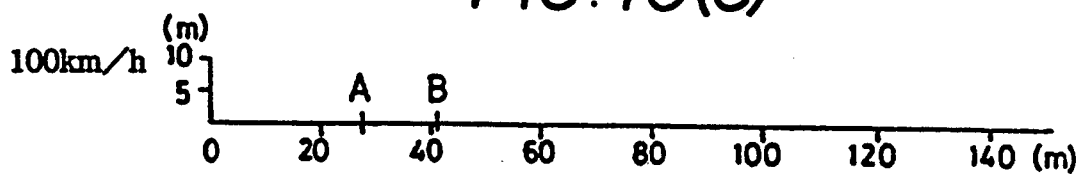

FIG. 10a shows an example of a traveling path when one left wheel (front or rear wheel) fails at point A while traveling straightforwardly with 60 km/h of speed, where the vertical axis indicates drift (m) and the transverse axis indicates travel distance (m). As seen from this path, a drift of about 1 to 2 m is created after traveling about 60 m. Likewise that, FIG. 10b shows a traveling path when torque of the right wheel (front or rear wheel) drops to zero at B point after 0.5 second from A point. FIG. 10c shows similarly a travel path when one left wheel (front or rear wheel) fails at A point while traveling straightforwardly at a speed of 100 km/h and FIG. 10d shows a travel path when torque of the right wheel (front or rear wheel) drops to zero at B point after 0.5 second from A point. As can be seen from the figures, the drift is corrected by controlling the torque of the opposite side wheel.

Figure 10E:
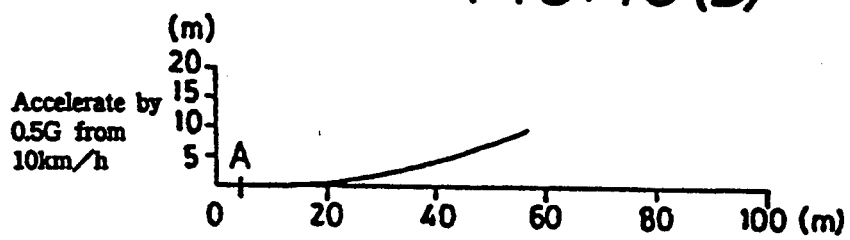
Figure 10F:
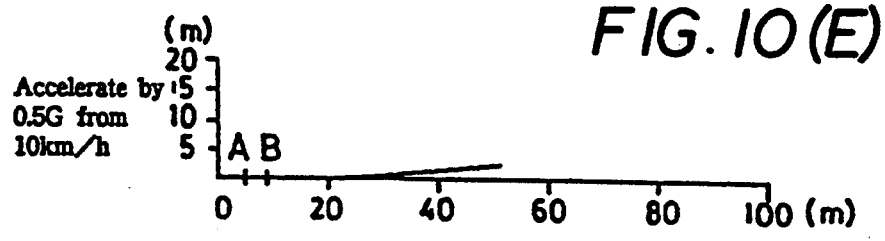
Figure 12:
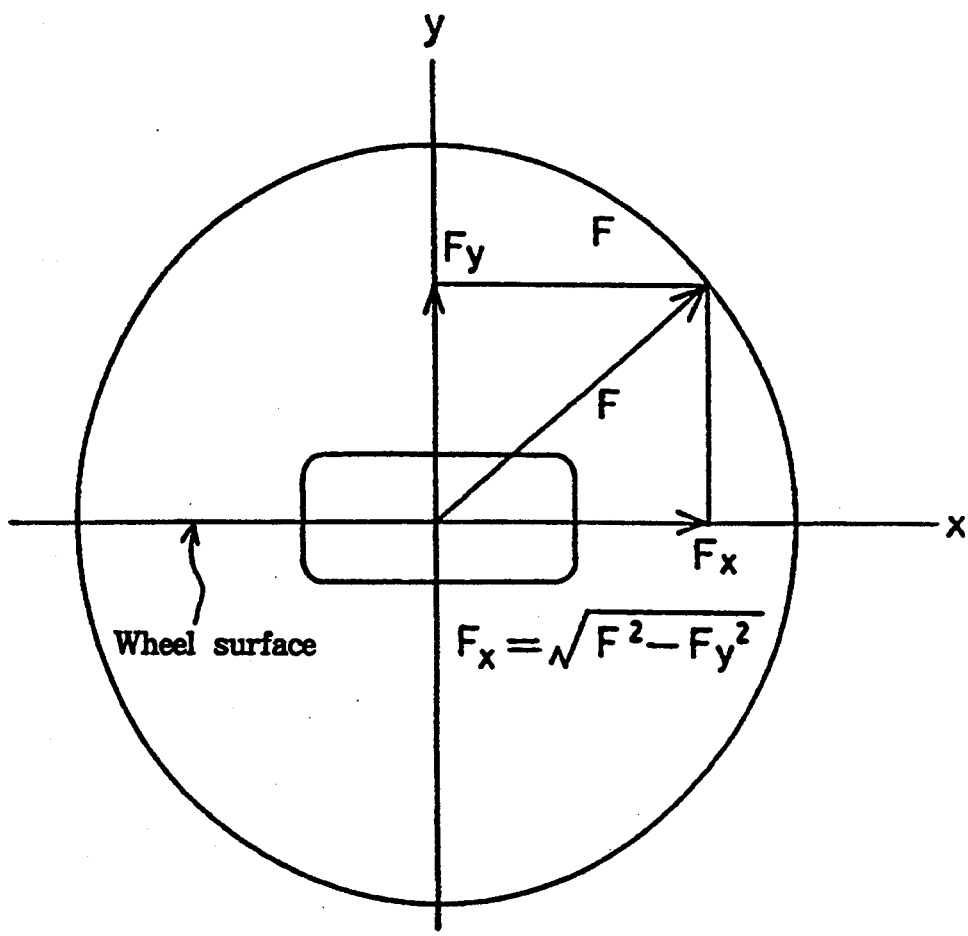
FIG. 12 is a diagram explaining the limit for driving force at a tire.

FIG. 10e show an example of a travel path when one rear wheel (front or left wheel) fails at A point while accelerating straightforwardly with 0.5 G from a speed of 10 Km/h. As seen in the figure, the drift is remarkably larger than that in the straightforward traveling aforementioned. However, it may be corrected almost to a straight line by changing torque of the opposite right side wheel (front or rear wheel) at A point after 0.5 second from B point as shown in FIG. 10f.

Furthermore, FIG. 11a shows a travel path when one wheel fails at A point while turning a stationary circle with 30 m of turning radius at a speed of 40 km/h. The vehicle drifts toward the inner side of the circle when either one of the left side wheels fails and toward the outside of the circle when either one of right side front or rear wheels fails. Likewise, when the torque of the opposite side wheel is drops to zero at B point after 0.5 second from A point, the drift is almost eliminated as shown in FIG. 11b. However, when one wheel fails at A point while turning a stationary circle with 30 m of turning radius at a speed of 50 km/h, whose travel path is shown in FIG. 11c, even if the torque of the opposite side wheel is turned to zero at B point after 0.5 second from A point, a drift toward the center of the circle still remains as shown in FIG. 11d. This happens because a larger steering angle is turned to offset higher centrifugal force while traveling at higher speed, so that when the torque of any of four wheels is turned to zero and the vehicle is driven only by the remaining front or rear wheel, the overall driving force lowers and the speed of the vehicle is lowered, causing the steering angle to be larger than necessary at that speed and causing the path of the vehicle to incline toward the inside of the circle. In such a case, the drift may be corrected by dropping the torque of the opposite side wheel to zero and by reducing torque of the remaining wheel on the same side or alternatively, by increasing the torque of the opposite wheel for that amount.

Figure 14:
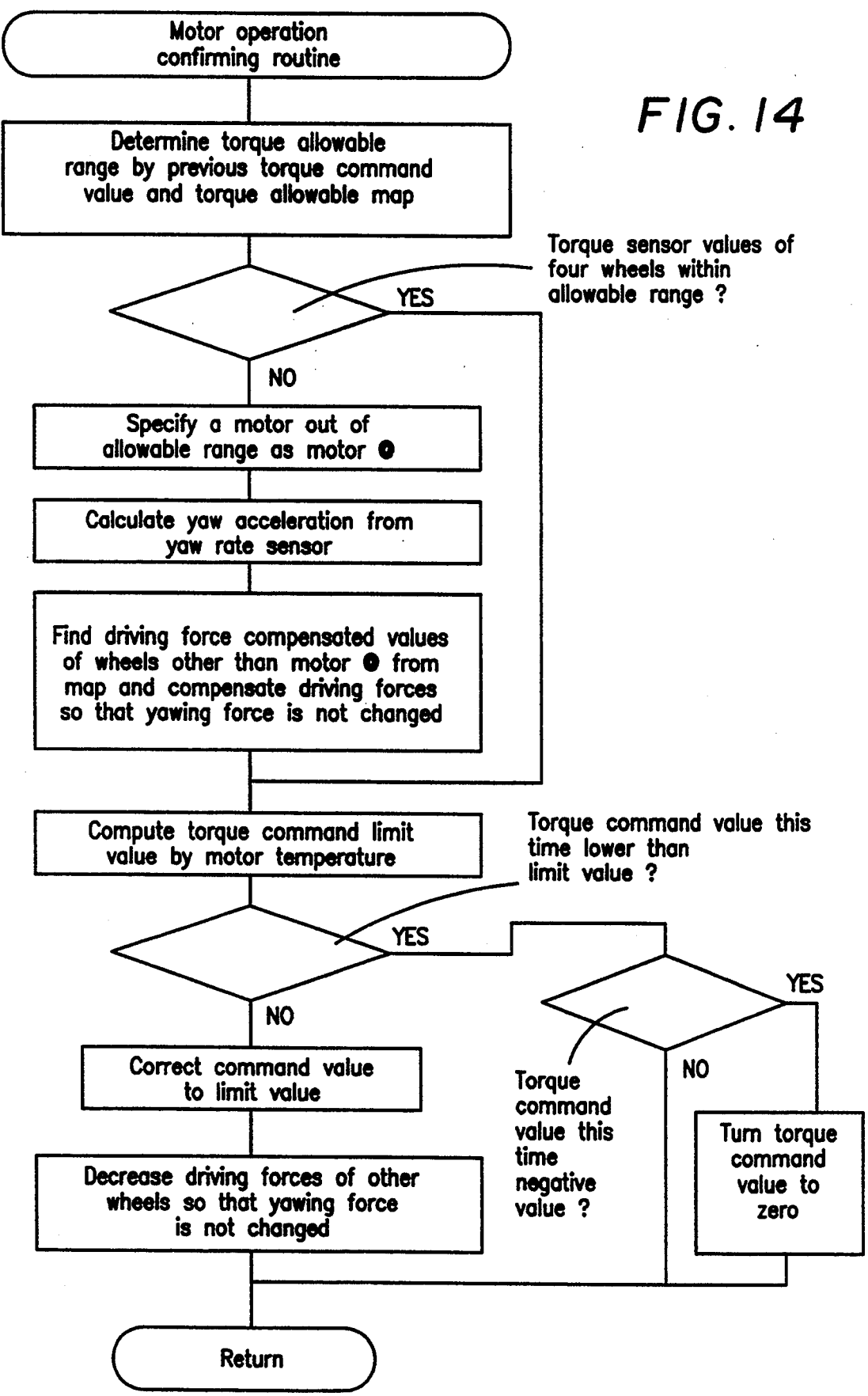
FIG. 14 is a flow chart for detecting trouble by a torque sensor.

As another embodiment, a motor operation confirming subroutine, shown in FIG. 14, will be explained.

Figure 17:
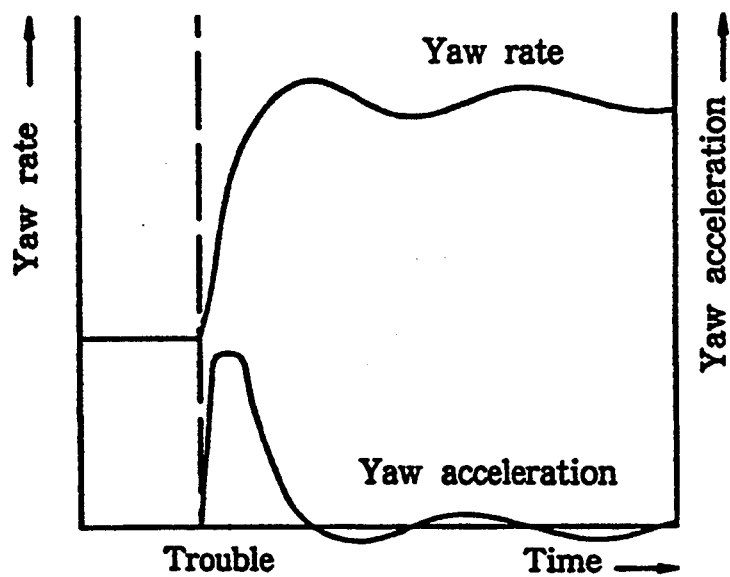
FIG. 17 is a graph showing changes in torque moments vs. changes in yaw rates.
Figure 18:
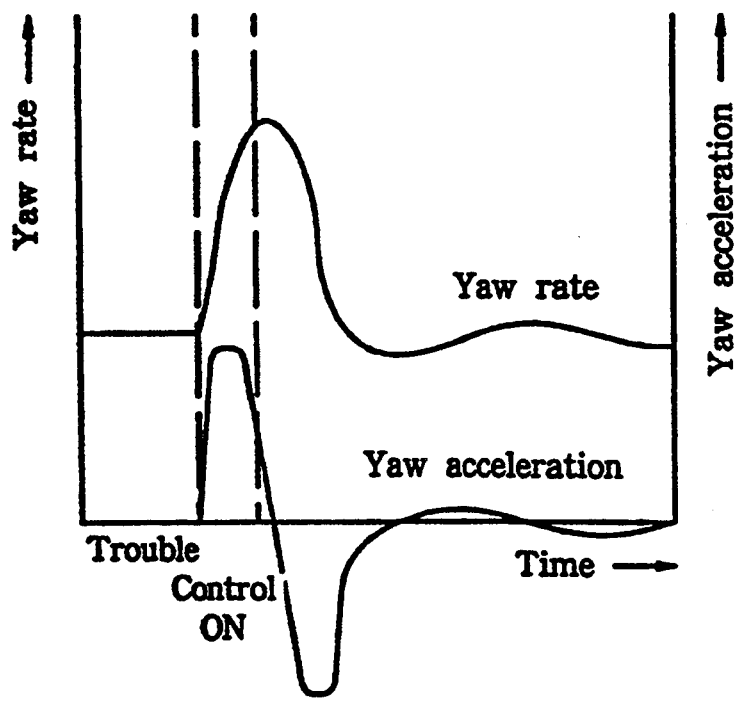
FIG. 18 is another graph showing changes in torque moments vs. changes in yaw rates.

When one of the motors gets into an abnormal state and the driving force of one wheel decreases, the yaw rate changes due to the change in torque moment caused by unbalanced driving forces as shown in FIG. 17. By estimating the change of the torque moment from the yaw acceleration to compensate the driving force of each motor, the change in the yaw rate may be suppressed and the nmbalance of the driving forces may be compensated as shown in FIG. 18. A control method for that is be explained below.

Figure 15:
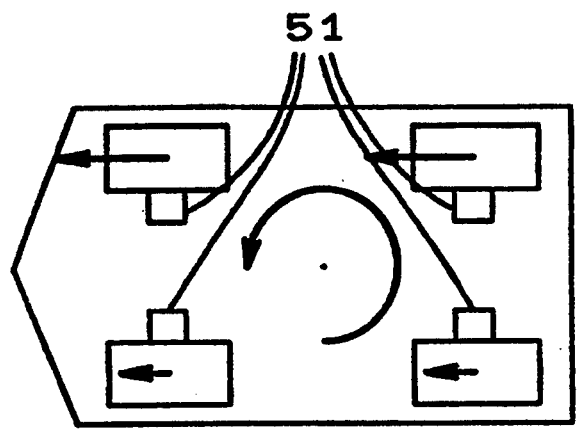
FIG. 15 is a drawing showing the wheels associated with torque sensors.
Figure 16:
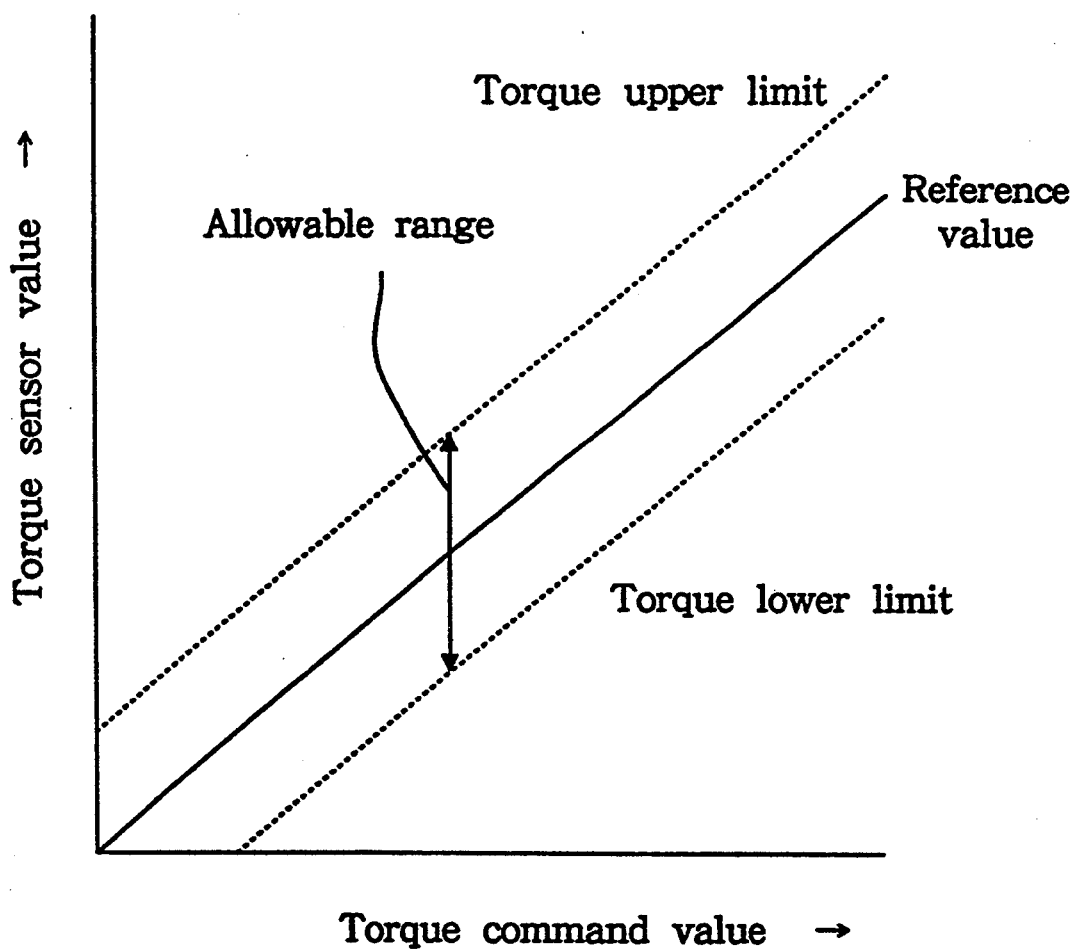
FIG. 16 is a graph illustrating a map of allowable torque.

As shown in FIG. 15, the torque allowable range is determined from the torque allowance map shown in FIG. 16 from the previous torque command value measured by torque sensors 51 provided on each wheel. This range represents torque command values having upper and lower limits with a width of a certain allowable range from a reference value that corresponds to a torque command value and is used for judging whether the torque of each wheel drive motor falls within the allowable range.

If the answer is NO (not within the allowable range), i.e. the torque of the motor is abnormal, the motor whose torque is out of the allowable range is specified as motor a. Then the yaw acceleration is calculated by a yaw rate sensor and driving force compensation values of the remaining three wheels are determined from a map shown in FIG. 19 and the driving force is compensated so that yawing force to the motor a is not changed. Then the torque command limit value is computed from the map of the torque command limit values shown in FIG. 8b by motor temperature and driver temperature and it is determined whether the torque command value this time is lower than the limit value. If the answer is YES (the torque command value is lower than the limit value), it is further determined whether the command value this time is negative. If the answer is YES, the torque command value is turned to zero and if NO, the step is returned as it is. If the answer whether the torque command value is lower than the limit value is NO (the torque command value is higher than the limit value), the command value is corrected to the limit value and the driving forces of the other wheels are decreased for balance so that the yawing force will not change.

FIG. 19 shows a compensation map of driving force of each wheel for a case when a right rear wheel fails. At this time, the driving force of the right front wheel is increased and that of the left front and rear wheels are decreased with the increase of yaw acceleration. It is also possible to increase the driving force of only the right front wheel if the right rear wheel fails as shown in FIG. 20a and it is also possible to decrease the driving forces of only the left front and rear wheels as shown in FIG. 20b. Thus the present embodiment allows various controls.

As described above, the behavior of the vehicle may be controlled so that it will not change largely by detecting abnormalities in wheel driving conditions and vehicle traveling conditions and by correcting the driving force computed for each wheel as appropriate for the abnormality. Abnormalities of wheel driving conditions include cases, for example, when the number of revolutions of the motor significantly deviates from the reference number of revolutions when the rate of change of the number of revolutions deviates from the acceleration or deceleration of the vehicle and when the motor temperature exceeds a predetermined value. In such cases, the computed driving forces are adjusted so that they fall in the predetermined range. A mean value of the number of revolutions of each motor just before an abnormality occurs, for example, may be used as the reference number of revolutions and the speed of the vehicle.

It should be understood that the present invention is not limited just to the aforementioned embodiment, but that various modifications may be made. For example, although a pole position was detected using the resolver in the above embodiment, the pole position may be estimated directly from the current and terminal voltage of the brushless motor without providing a position detector. In such case, this problems as dislocation in mounting the position detector are eliminated, so that reliability is improved and the motor may be downsized. Furthermore, although yaw acceleration was found by differentiating yaw rate in the aforementioned embodiment, it is also possible to employ a yaw acceleration sensor.

As described above, according to the present invention, the value of driving force to be provided at each wheel is computed based on each detection signal from the wheel driving force detecting means, vehicle condition detecting means and driving condition detecting means, so that the value of the driving force to be provided at each wheel according to shift of load from the inner wheel to the outer wheel when turning may be established and the cornering capability during turning may be prevented from decreasing, thus preventing the behavior of the vehicle from becoming unstable. Furthermore, the computed values of driving force are corrected when the traveling conditions of the vehicle or the driving conditions of the wheels exceed the predetermined ranges, so that when trouble is detected occurring at either right or left wheel caused by traveling conditions of the vehicle or wheel driving conditions or when slip or spin occurs, the driving forces may be controlled so that changes in traveling conditions caused by them are corrected and stable traveling may be realized.

What is claimed is:

1. A driving force controller for an electric motor vehicle having wheels independently driven by electric motors, said controller comprising:
   driving demand detecting means for detecting a value of driving force demanded for said vehicle;
   vehicle condition detecting means, for detecting traveling conditions of said vehicle, comprising:
   a steering angle sensor for detecting a steering angle; and
   vehicle turn detecting means for detecting a vehicle condition associated with the turning of the vehicle;
   plural wheel condition detecting means, for independently detecting a driving condition of each individual wheel;
   driving force computing means including (a) means responsive to said value of demanded driving force, said detected traveling conditions and said detected wheel driving conditions for computing distributed low values of driving forces to be distributed to each wheel; (b) means responsive to the computed distributed low values of driving forces to be distributed to each wheel for determining a normal range for at least one of said detected vehicle traveling conditions indicating normal operation of each wheel necessary for the vehicle to travel along a desired course; and (c) means responsive to said at least one of said detected traveling conditions being outside of said determined normal range for correcting said computed distributed low values of driving forces to be distributed to each wheel so as to reduce deviation of the travel of the vehicle from the desired course; and
   a plurality of motor drivers responsive to said computed distributed low values of driving forces to be distributed to each wheel, each motor driver being associated with one of said motors for independently controlling the associated motor to generate an output driving force that corresponds to said respective computed distributed low value of driving force from said driving force computing means.

2. The driving force controller according to claim 1, wherein said driving force computing means compares said value of demanded driving force detected by said driving demand detecting means and said signal detected by said vehicle condition detecting means and corrects said computed values of driving force in accordance with said comparison.

3. The driving force controller according to claim 1, wherein said driving demand detecting means detects the degree of depression of an accelerator pedal.

4. The driving force controller for an electric motor vehicle according to claim 1, wherein said vehicle turn detecting means is a yaw rate sensor for detecting vehicle turning acceleration.

5. The driving force controller for an electric motor vehicle according to claim 1, wherein said plural wheel condition detecting means are current sensors for detecting current of said motors.

6. The driving force controller for an electric motor vehicle according to claim 1, wherein said plural wheel condition detecting means are torque sensors provided on said motors.

7. A driving force controller for an electric motor vehicle having wheels independently driven by electric motors, said controller comprising:
   driving demand detecting means for detecting a value of driving force demanded for said vehicle;
   vehicle condition detecting means, for detecting traveling conditions of said vehicle, comprising:
      a steering angle sensor for detecting a steering angle; and
      vehicle turn detecting means for detecting a vehicle condition associated with the turning of the vehicle;
   plural wheel condition detecting means, for independently detecting a driving condition of each individual wheel;
   driving force computing means including means responsive to said value of demanded driving force, said detected traveling conditions and said detected wheel driving conditions for computing distributed low values of driving forces to be distributed to each wheel; (b) means responsive to the computed distributed low values of driving forces to be distributed to each wheel for determining a normal range for each detected wheel driving condition necessary for the vehicle to travel along a desired course; and (c) means responsive to one of said detected wheel driving conditions being outside of its corresponding normal range for correcting said computed distributed low values of driving force so as to reduce deviation of the travel of the vehicle from the desired course; and
   a plurality of motor drivers responsive to the respective computed distributed low values of driving forces to be distributed to each wheel, each motor driver being associated with one of said motors for independently controlling the associated motor to generate an output driving force that corresponds to said respective computed distributed low value of driving force from said driving force computing means.

8. A driving force controller according to claim 7, wherein said driving force computing means corrects said computed values of driving forces to be applied by a plurality of said wheels responsive to a determination that a signal received from a wheel condition detecting means associated with another wheel falls outside of said determined range.

9. A driving force controller according to claim 7, wherein said vehicle has at least one right and one left wheel independently driven by motors and said driving force computing means decreases the computed value of driving force for one of said right and left wheels when a signal received from wheel condition detecting means associated with the other of said right and left wheels exceeds a predetermined range.

10. The driving force controller according to claim 7, wherein said vehicle has front and rear wheels at each of right and left sides and wherein said driving force computing means increases the computed value of driving force to be generated at one wheel on one of said sides responsive to receipt of a signal, for the other wheel on said one side, from said wheel condition detecting means, exceeds a predetermined range.

11. The driving force controller according to claim 7, wherein said vehicle has front and rear wheels at each of right and left sides and wherein said driving force computing means increases the computed value of driving force for one wheel on one of said sides and decreases the computed value of driving force for the wheel opposite said one wheel when a signal of the other wheel on said one side detected by said wheel condition detecting means exceeds a predetermined range.

12. A driving force controller in accordance with claim 7, wherein said wheel condition detector detects current and voltage for the associated wheel drive motor.

13. A driving force controller in accordance with claim 7, wherein said drive demand detector detects the stroke of an accelerator pedal.

14. A driving force controller according to claim 7, wherein said vehicle condition sensor is a yaw rate or yaw acceleration sensor.

15. The driving force controller for an electric motor vehicle according to claim 7 wherein said plural wheel condition detecting means are current sensors for detecting the current in each motor.

16. The driving force controller for an electric motor vehicle according to claim 7 wherein said plural wheel condition detecting means are torque sensors provided on said motors.

17. The driving force controller for an electric motor vehicle according to claim 15 further comprising a memory and, stored in said memory, a map of an allowable range for current in one of said motors plotted against values for said demanded driving force and wherein said driving force computing means determines said range for detected wheel condition by reference to said map.

18. The driving force controller for an electric motor vehicle according to claim 16 further comprising a memory and, stored in said memory, a map of an allowable range for torque in one of said motors plotted against values for said demanded driving force and wherein said driving force computing means determines said range for detected wheel condition by reference to said map.

* * * * *

UNITED STATES PATENT AND TRADEMARK OFFICE
CERTIFICATE OF CORRECTION

PATENT NO. : 5,376,868
DATED : December 27, 1994
INVENTOR(S) : TOYODA et al

It is certified that error appears in the above-indentified patent and that said Letters Patent is hereby corrected as shown below:

Title page, item "[73] Assignee: Aisin Aw" should read --AISIN AW--.

Col. 3, line 61, "3d" should read --3D--.

Col. 6, line 2, delete "force" and insert --demand--.

Col. 7, line 6, "angel" should read --angle--;

line 31, after "and" insert --demanded--; and line 53, "Judgement" should read --judgement--.

Col. 9, line 28, delete "which," insert --which--; and line 68, delete "that".

Col. 10, line 12, delete "rear" insert --left-- and delete "or left" insert --or rear--;

line 18, delete "A" and insert --B--;

line 19, delete "B" insert --A--;

line 25, delete "front";

line 26, delete "or rear"; and

UNITED STATES PATENT AND TRADEMARK OFFICE
CERTIFICATE OF CORRECTION

PATENT NO. : 5,376,868                    Page 2 of 2
DATED      : December 27, 1994
INVENTOR(S): TOYODA et al It is certified that error appears in the above-indentified patent and that said Letters Patent is hereby corrected as shown below:

line 58, delete "nmbalance" insert --unbalance--.

Col. 12, line 19, delete "the" insert --a--.

Signed and Sealed this

Twenty-sixth Day of September, 1995

Attest:

BRUCE LEHMAN

Attesting Officer        Commissioner of Patents and Trademarks